(12) United States Patent
Mukai et al.

(10) Patent No.: US 6,543,572 B2
(45) Date of Patent: Apr. 8, 2003

(54) ELECTRIC POWER STEERING APPARATUS

(75) Inventors: Yoshinobu Mukai, Wako (JP); Osamu Tsurumiya, Wako (JP); Kazuhisa Watanabe, Haga-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/213,196

(22) Filed: Aug. 5, 2002

(65) Prior Publication Data
US 2002/0189893 A1 Dec. 19, 2002

Related U.S. Application Data

(62) Division of application No. 09/915,881, filed on Jul. 26, 2001, now Pat. No. 6,470,995.

(30) Foreign Application Priority Data

Aug. 21, 2000 (JP) ........................................ 2000-249810

(51) Int. Cl.[7] .............................. B62D 5/04; B62D 6/00
(52) U.S. Cl. ......................................... 180/446; 701/41
(58) Field of Search ............................ 180/446; 701/36, 701/39, 41

(56) References Cited

U.S. PATENT DOCUMENTS

| 4,878,004 A | * | 10/1989 | Shimizu ...................... 180/446 |
| 6,266,591 B1 | | 7/2001 | Wilson-Jones et al. |
| 6,390,229 B1 | | 5/2002 | Kaji |
| 6,470,995 B2 | * | 10/2002 | Mukai et al. ................ 180/446 |

FOREIGN PATENT DOCUMENTS

JP          62-292575        12/1987

* cited by examiner

Primary Examiner—Lesley D. Morris
Assistant Examiner—Matthew Luby
(74) Attorney, Agent, or Firm—Merchant & Gould P.C.

(57) ABSTRACT

An electric power steering apparatus includes a control unit 12 for outputting an electric motor control signal $V_O$ to control an electric motor 8 for adding an auxiliary steering torque, in response to at least the manual steering torque signal T from a torque sensor TS. The control unit 12 carries out a control to limit a maximum value of the electric motor control signal $V_0$ in response to an electric motor current signal IMO sent from an electric motor current detecting unit 14. The control unit 12 includes a maximum value limitation indicating unit 26 for measuring the number of times of a maximum value limitation of the electric motor control signal $V_O$ and has such a structure that conditions for starting the maximum value limitation of the control signal $V_O$ are set to be more strict at a first time than those at a second time and thereafter.

5 Claims, 5 Drawing Sheets

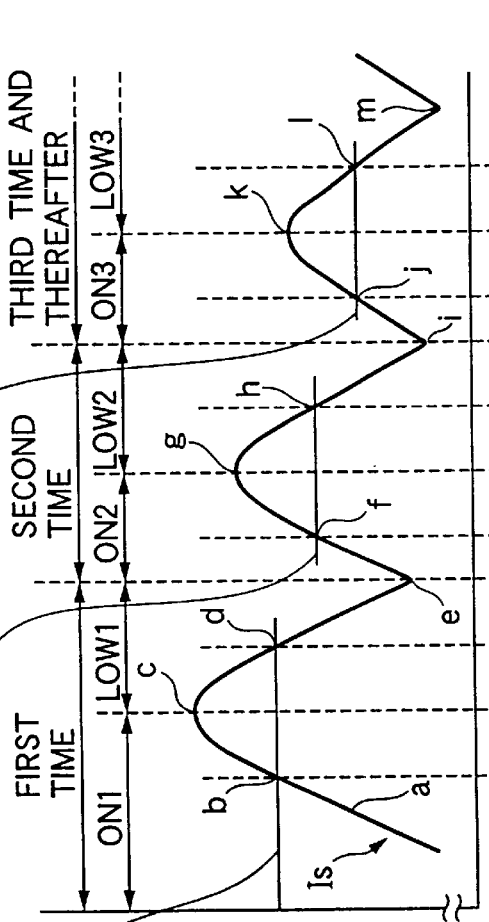
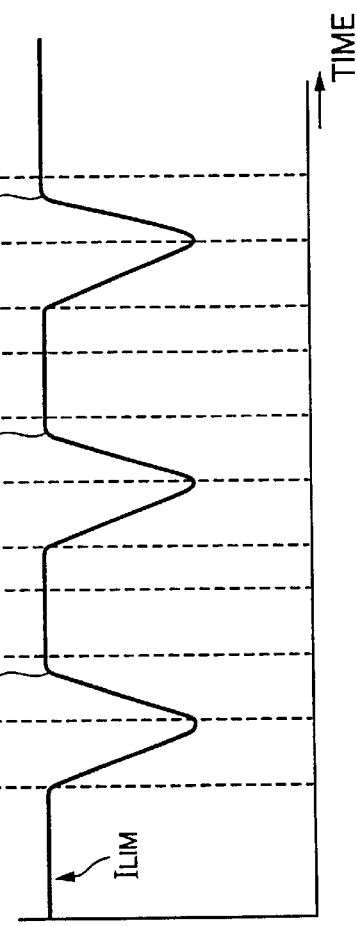
FIG.4A
FIG.4B

ELECTRIC POWER STEERING APPARATUS

This application is a divisional of application Ser. No. 09/915,881 filed Jul. 26, 2001 now U.S. Pat. No. 6,470,995.

BACKGROUND OF THE INVENTION

1. Field of the Invention

The present invention relates to an electric power steering apparatus which relieves the steering force of a driver by causing the driving force of an electric motor to directly act on a steering system, thereby, and more particularly to an electric power steering apparatus capable of properly carrying out unload control.

2. Description of the Related Art

An electric power steering apparatus serves to relieve (assist) the steering force of a driver by causing the driving force of an electric motor to directly act. A vehicle having the electric power steering apparatus mounted thereon has generally been spread widely. By the electric power steering apparatus, the movement of a steering wheel becomes quick and the driver does not need to carry out a steering operation by strong force.

The electric power steering apparatus includes an electric motor driving circuit constituted by a bridge circuit of a field effect transistor (hereinafter referred to as an "FET") for generating an electric motor driving signal to drive an electric motor in response to an electric motor control signal (a control signal) output from a controller. The FET generates heat when producing the electric motor driving signal based on the control signal. When the heat generation is excessively maintained, the temperature of the FET is largely raised, so that the function of the FET is deteriorated or the FET is broken in some cases. In order to prevent the deterioration or the breakage, accordingly, unload control (the limitation of the maximum value of the control signal) is carried out, in which the maximum value of the control signal is limited when the temperature of the FET is raised, so that the heat generation of the FET is controlled to drop the temperature of the FET.

In order to carry out the unload control, it is considered that a temperature sensor for measuring the temperature of the FET is used. However, it is not preferable that the temperature sensor should be used because the cost of the device is increased. For this reason, the temperature of the FET is estimated without using the temperature sensor and the unload control is carried out based on the estimated temperature. Conventionally, the temperature of the FET has been estimated by the following Equation 1.

Temperature of FET≈Atmospheric temperature (initial set value)+ ∫(current value in predetermined time)     (Equation 1)

The atmospheric temperature is an initial set value (fixed value) for estimating the temperature of the FET. The atmospheric temperature is set to a safety side in order to reliably prevent the heating failure of the FET (to prevent the FET from being damaged on the worst conditions). Usually, the electric power steering apparatus is attached to an engine room provided in front of a vehicle. Therefore, the atmospheric temperature is set to a high temperature of approximately 80° C. on the basis of the temperature of the engine room. A current value in a predetermined time (a current value of an electric motor current) is integrated and added to estimate the temperature of the FET, and the unload control is carried out based thereon. Consequently, the actual temperature of the FET does not exceed a limit temperature (for example, 120° C.). Therefore, the FET can always be used in good conditions.

In the conventional electric power steering apparatus, however, when the temperature of the engine room is low, for example, the engine of the vehicle is just started up or when the actual temperature of the FET is low, for example, straight running is maintained for a while and the FET is not operated, if a large current flows in a predetermined time, it is decided that the temperature of the FET exceeds the limit temperature and the unload control is started. In other words, the unload control is started unnecessarily. When the unload control is started, since the maximum value of a control signal is limited, the maximum value of an electric motor driving signal supplied to the electric motor is also limited. For this reason, the driver cannot fully receive an assist through the auxiliary steering torque of the electric motor. Thus, a steering feeling is deteriorated. On the other hand, when the atmospheric temperature in the Equation 1 is set to be low, the unload control is not started when it is necessary and the function of the FET is deteriorated or the FET is damaged due to heat generation.

SUMMARY OF THE INVENTION

Therefore, it is an object of the invention to provide an electric power steering apparatus capable of properly carrying out unload control.

In consideration of the problems, the inventors made a study eagerly and paid attention to the fact that the actual temperature of the FET obtained when the maximum value limitation of a control signal is started through unload control at a first time is lower than the actual temperature of the FET obtained when the maximum value limitation is started at a second time and thereafter, the maximum value limitation for the first time is not actually necessary or the maximum value limitation may be less carried out than that for the second time and thereafter. Thus, they completed the invention.

More specifically, in order to solve the problems, a first aspect of the invention is directed to an electric power steering apparatus comprising an electric motor for adding an auxiliary steering torque to a steering system of a vehicle, a steering torque detecting unit for detecting a manual steering torque of the steering system, a control unit for outputting a control signal controlling the electric motor in response to at least a signal sent from the steering torque detecting unit, a driving control unit including a switching element for driving the electric motor in response to the control signal sent from the control unit, and a current detecting unit for detecting an electric motor current flowing to the electric motor, the control unit controlling so as to limit a maximum value of the control signal in response to a signal sent from the current detecting unit. The control unit includes a limitation number measuring unit for measuring the number of times of a maximum value limitation of the control signal and has such a structure that a condition for starting the maximum value limitation of the control signal are set to be more strict at a first time than that at a second time and thereafter.

The maximum value of the control signal (electric motor control signal) is limited in response to the signal (electric motor current signal) sent from the electric motor current detecting unit and the unload control is started. With such a structure, the conditions (maximum value limitation start conditions) for starting the maximum value limitation of the control signal is caused to be strict at the first time. The wording "strict" means that the maximum value limitation at the first time is started more difficult than that at the second time and thereafter. In other words, the temperature of the FET obtained when the maximum value limitation is started at the first time is lower than the temperature of the FET obtained when the maximum value limitation is started at the second time and thereafter. Therefore, such a maximum value limitation is carried out. Corresponding to the difficult start of the maximum value limitation, a driver is assisted in a steering operation through the auxiliary steering torque of the electric motor. The maximum value limitation start conditions can be set variously. When the maximum value limitation of the control signal is carried out, a load on the FET is decreased so that the temperature of the FET is reduced. While the engine is started up and is then stopped, the maximum value limitation to be carried out at the first time is not always performed once but plural times in some cases. The reason is that the temperature of the FET is reduced and the maximum value control to be carried out at the second time may be set to be performed at the first time. In this respect, the invention has the same situation.

Moreover, a second aspect of the invention is directed to an electric power steering apparatus comprising an electric motor for adding an auxiliary steering torque to a steering system of a vehicle, a steering torque detecting unit for detecting a manual steering torque of the steering system, a control unit for outputting a control signal controlling the electric motor in response to at least a signal sent from the steering torque detecting unit, a driving control unit including a switching element for driving the electric motor in response to the control signal sent from the control unit, and a current detecting unit for detecting an electric motor current flowing to the electric motor, the control unit controlling so as to limit a maximum value of the control signal in response to a signal sent from the current detecting unit. The control unit includes a limitation number measuring unit for measuring the number of times of a maximum value limitation of the control signal and has such a structure that the maximum value limitation of the control signal is set to be smaller at a first time than that at a second time and thereafter.

Also in the invention, the maximum value of the control signal is limited and the unload control is started in response to the signal sent from the electric motor current detecting unit. With such a structure, the maximum value limitation of the control signal is started on the same maximum value limitation start conditions at the first time and the second time and thereafter, for example. However, the contents of the maximum value limitation are varied, the maximum value limitation is more reduced (the maximum value limitation is more relieved) at the first time and a large auxiliary steering torque can be generated. The temperature of the FET obtained when the maximum value limitation is to be started at the first time is lower than the temperature of the FET obtained when the maximum value limitation is started at the second time and thereafter. Therefore, such a maximum value limitation is carried out. The maximum value control start conditions may be varied.

BRIEF DESCRIPTION OF THE DRAWINGS

FIG. 4A is a time chart showing a change in an integrated current value according to the first embodiment of the invention;

FIG. 4B is a time chart showing a change in a limited current signal in the electric power steering apparatus according to the first embodiment of the invention;

DETAILED DESCRIPTION OF THE PREFERRED EMBODIMENTS

An electric power steering apparatus according to an embodiment of the invention will be described below in detail with reference to the drawings.

First Embodiment

In a first embodiment, the maximum value limitation start conditions of a control signal (electric motor control signal) in unload control are set strictly at a first time, so that it makes difficult to start the maximum value limitation. The structure of the electric power steering apparatus will be described below with reference to FIGS. 1 to 3.

Figure 1:
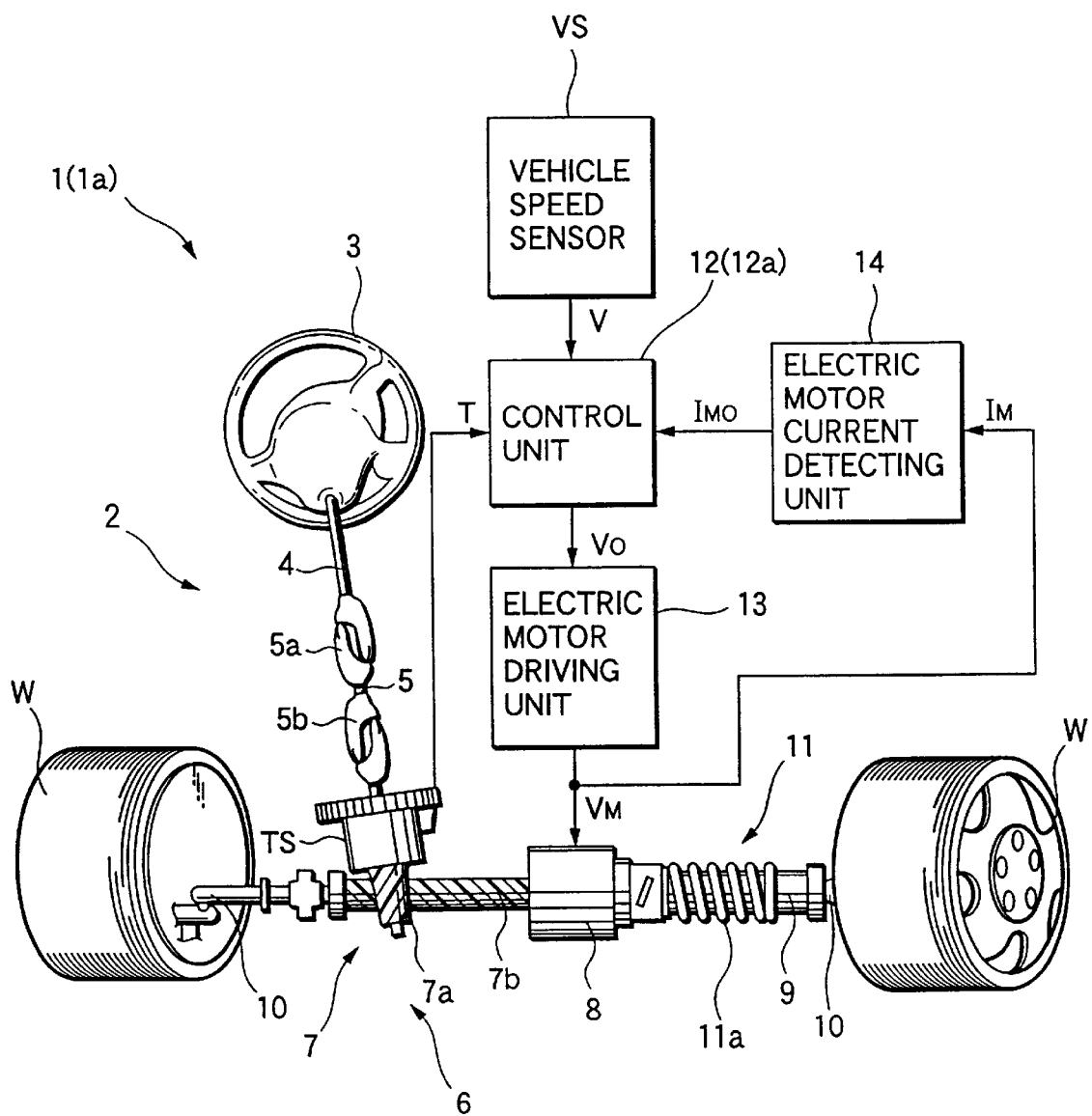
FIG. 1 is a view showing the whole structure of an electric power steering apparatus according to a first embodiment (second embodiment) of the invention.
Figure 2:
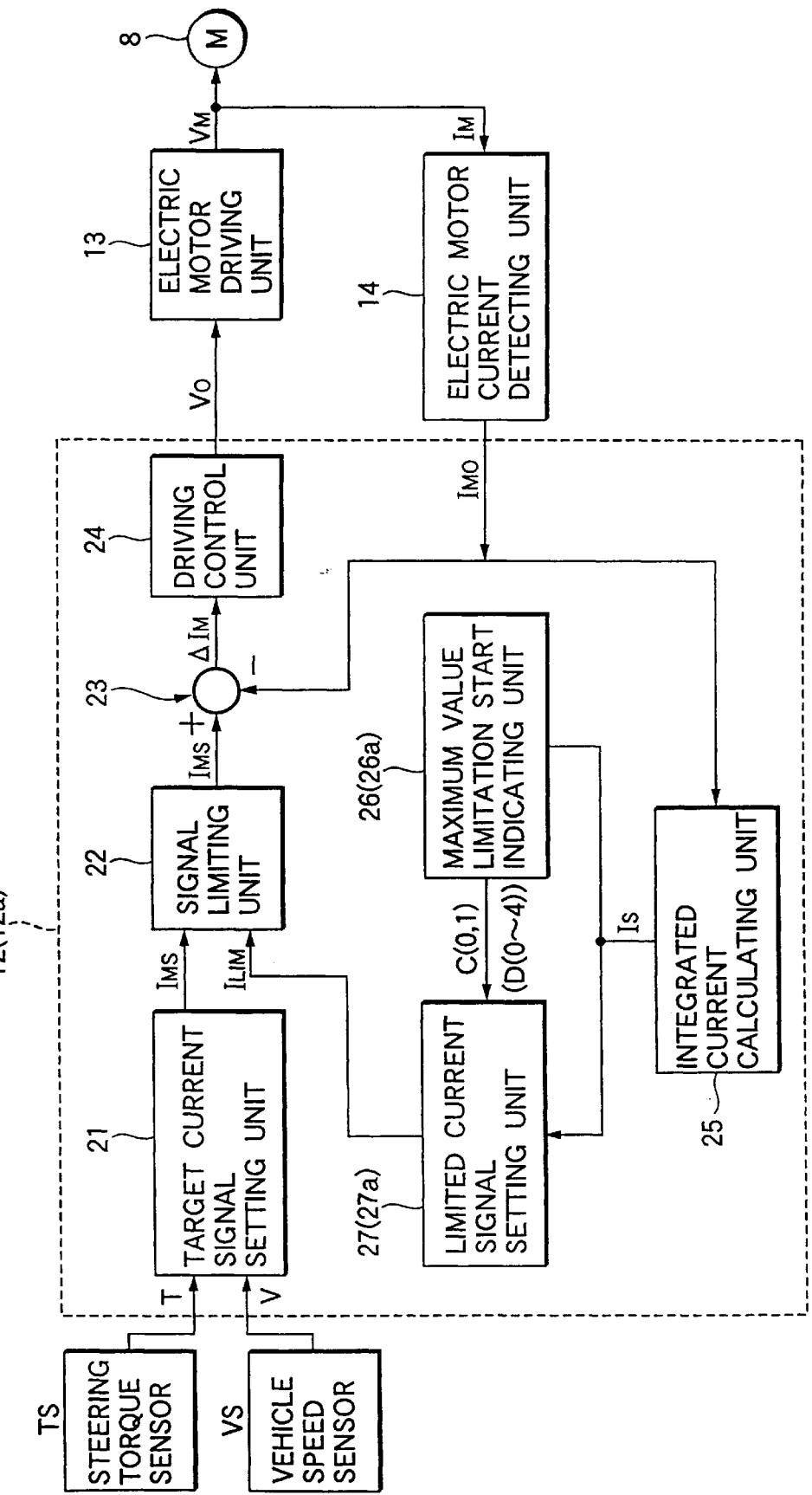
FIG. 2 is a block diagram showing the structure of an electric system of the electric power steering apparatus in FIG. 1.
Figure 3:
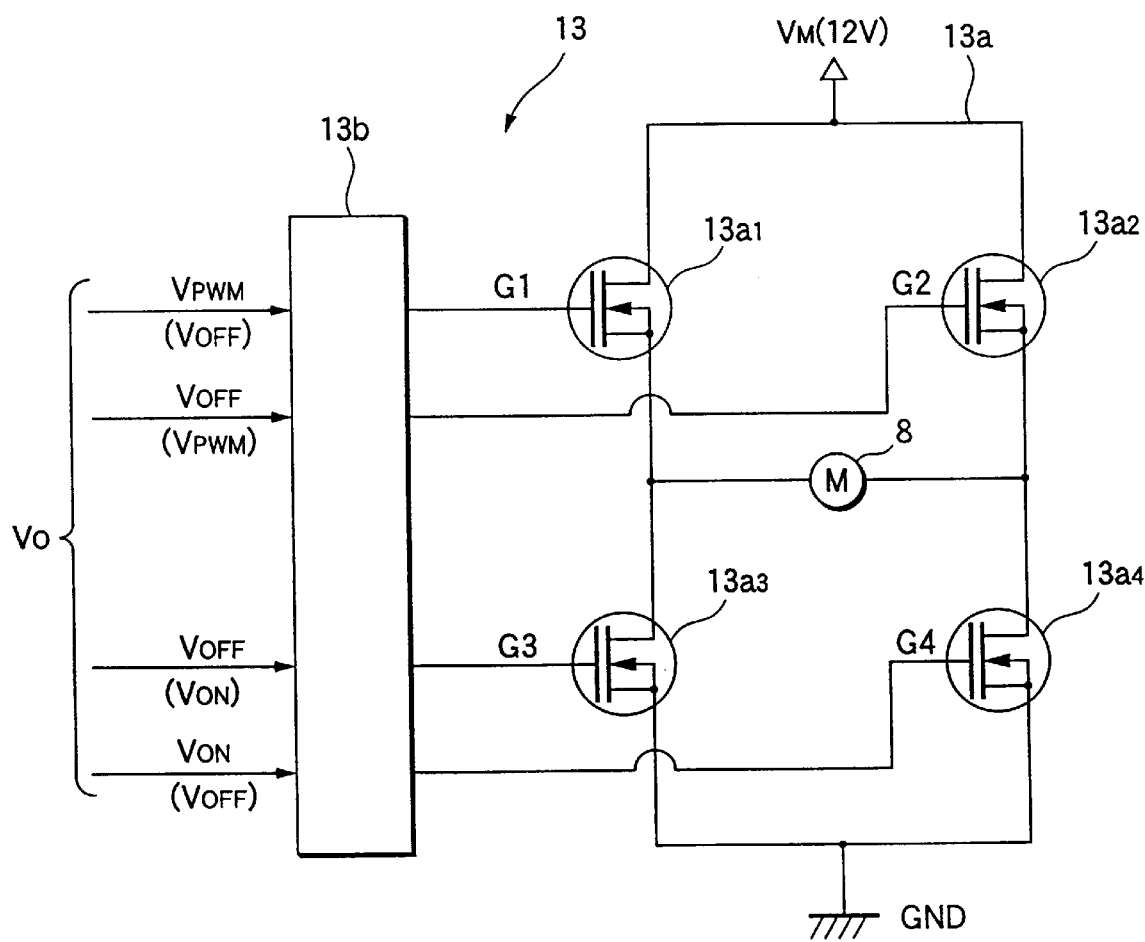
FIG. 3 is a circuit diagram showing an electric motor driving unit in FIG. 2.

FIG. 1 is a block diagram showing the whole structure of the electric power steering apparatus. FIG. 2 is a block diagram showing the structure of an electric system of the electric power steering apparatus. FIG. 3 is a circuit diagram showing an electric motor driving unit. The reference numerals 1a and 12a in parentheses of FIG. 1 and the reference numeral 12a in parentheses of FIG. 2 will be described in a second embodiment.

As shown in FIG. 1, an electric power steering apparatus 1 rolls front wheels W and W by manual steering through a manual steering force generating unit (steering system) 2 to change the direction of a vehicle when a driver steers a steering wheel 3. Furthermore, the electric power steering apparatus 1 generates an electric motor driving signal $V_M$ through an electric motor driving unit 13 based on an electric motor control signal $V_O$ sent from a control unit 12, drives an electric motor 8 in response to the electric motor driving signal $V_M$ to generate an auxiliary steering torque (auxiliary steering force), thereby relieving a steering torque (manual steering force) generated by the manual steering force generating unit 2.

In the manual steering force generating unit 2, a pinion 7a of a rack and pinion mechanism 7 provided in a steering gear box 6 is connected through a connecting shaft 5 to a steering shaft 4 provided integrally with the steering wheel 3. The connecting shaft 5 includes universal joints 5a and 5b provided on both ends thereof. In the rack and pinion mechanism 7, a rack tooth 7b to be engaged with the pinion 7a is formed on a rack shaft 9 and the rotation of the pinion 7a is changed to the transverse reciprocation of the rack shaft 9 through the engagement of the pinion 7a with the rack tooth 7b. Furthermore, the right and left front wheels W and W to be rolling wheels are connected to both ends of the rack shaft 9 through tie rods 10 and 10.

In the electric power steering apparatus 1, the electric motor 8 is provided coaxially with the rack shaft 9 in order to generate an auxiliary steering torque. The rotation of the electric motor 8 is converted into a thrust through a ball screw mechanism 11 provided coaxially with the rack shaft 9 and the thrust is caused to act on the rack shaft 9 (a ball screw shaft 11a).

Detection signals T and V of a steering torque sensor TS and a vehicle speed sensor VS are input to the control unit 12. Then, the control unit 12 usually generates an electric motor control signal $V_O$ (a direction signal+a PWM signal) based on the detection signals T and V respectively and outputs the same signal to the electric motor driving unit 13. The details of the control unit 12 will be described below.

The steering torque sensor TS is provided in the steering gear box 6 and serves to detect the magnitude and direction of a manual steering torque (manual steering force) of the driver. Then, the steering torque sensor TS outputs, to the control unit 12, the steering torque signal T corresponding to the manual steering torque thus detected.

The vehicle speed sensor VS serves to output, to the control unit 12, the vehicle speed signal V based on the number of rotations of an output shaft of a transmission which is not shown. The steering torque signal T and the vehicle speed signal V to be input to the control unit 12 are digital signals obtained through digital conversion.

The electric motor driving unit 13 supplies, to the electric motor 8, the electric motor driving signal $V_M$ based on the electric motor control signal $V_O$ output from the control unit 12 and drives the electric motor 8. The electric motor driving unit 13 is constituted by a bridge circuit 13a including switching elements of four FETs (field effect transistors) $13_{a1}$, $13_{a2}$, $13_{a3}$ and $13_{a4}$ and a gate driving circuit 13b shown in FIG. 3, for example. When the electric motor control signal $V_O$ (a direction signal+a PWM signal) is input to gates G1, G2, G3 and G4 of the power FETs $1_{a1}$, $13_{a2}$, $13_{a3}$ and $13_{a4}$, the electric motor driving signal $V_M$ is supplied to the electric motor 8 based on the electric motor control signal $V_O$. Consequently, an electric motor current flows to the electric motor 8 and the electric motor 8 generates an auxiliary steering torque which is proportional to the electric motor current, thereby assisting the steering operation of the driver. In this case, the FETs $13_{a1}$ to $13_{a4}$ generate heat to raise the temperature. Therefore, the unload control is required.

An electric motor current detecting unit 14 includes a resistor or a hole element which is connected in series to the electric motor 8, and serves to detect the magnitude and direction of an electric motor current $I_M$ actually flowing to the electric motor 8. The electric motor current $I_M$ detected by the electric motor current detecting unit 14 is converted to an electric motor current signal $I_{MO}$ of the digital signal and is fed back (negative feedback) to the control unit 12.

Next, the structure of the control unit 12 will be described in detail with reference to FIG. 2.

The control unit 12 includes a target current signal setting unit 21, a signal limiting unit 22, a deviation calculating unit 23, a driving control unit 24, an integrated current calculating unit 25, a maximum value limitation start indicating unit 26 and a limited current signal setting unit 27.

The target current signal setting unit 21 is constituted by an ROM and a logic circuit. The target current signal setting unit 21 includes a steering torque T—vehicle speed V—target current signal $I_{MS}$ table set based on an experiment or a theoretical calculation, and serves to read the target current signal $I_{MS}$ based on the steering torque signal T output from the steering torque sensor TS and the vehicle speed signal V output from the vehicle speed sensor VS and to output the same signal $I_{Ms}$ to the signal limiting unit 22 in a rear stage.

The signal control unit 22 is constituted by a comparing circuit or the comparing function of soft control. The signal limiting unit 22 inputs the target current signal $I_{MS}$ output from the target current signal setting unit 21 and a limited current signal $I_{LIM}$ output from the limited current signal setting unit 27 which will be described below, compares absolute values, selects any of the signals ($I_{MS}$ or $I_{LIM}$) having a smaller value to be the target current signal $I_{MS}$ and outputs the target current signal $I_{MS}$ to the deviation calculating unit 23 in the rear stage. The signal limiting unit 22 sets the polarity of the target current signal $I_{MS}$ to be output to be identical to the polarity of the target current signal $I_{MS}$ output from the target current signal setting unit 21.

The deviation calculating unit 23 is constituted by a subtracter or the subtracting function of the soft control. The deviation calculating unit 23 inputs the target current signal $I_{MS}$ output from the signal limiting unit 22 and the electric motor current signal $I_{MO}$ output from the electric motor current detecting unit 14, subtracts the electric motor current signal $I_{MO}$ from the target current signal $I_{MS}$ and calculates a deviation signal $\Delta I_M (=I_{MS}-I_{MO})$. The deviation signal $\Delta I_M$ thus calculated is output to the driving control unit 24 in the rear stage.

The driving control unit 24 is constituted by a PID controller, a PWM signal generating unit, a logic circuit and the like. The driving control unit 24 inputs the deviation signal $\Delta I_M$ from the deviation calculating unit 23 and outputs the electric motor control signal $V_O$ to the electric motor driving unit 13. The driving control unit 24 first carries out P (proportion), I (integration) and D (differentiation) control over the deviation signal $\Delta I_M$, and furthermore, generates a PWM signal $V_{PWM}$, an ON signal $V_{ON}$ and an OFF signal $V_{OFF}$ corresponding to the magnitude and polarity of the result of the control, and outputs the electric motor control signal $V_O$ to the electric motor driving unit 13. The electric motor voltage $V_M$ output from the electric motor driving unit 13 is supplied to the electric motor 8 to drive the electric motor 8.

The integrated current calculating unit 25 is constituted by an ROM and a logic circuit. The integrated current calculating unit 25 samples and inputs the electric motor current signal $I_{MO}$ sent from the electric motor current detecting unit 14 at predetermined intervals. Based on the following Equation 2, an integrated current value $I_s$ is calculated.

$$I_s = I_n + 0.99 \times I_{n-1} + \ldots 0.01 \times I_{n-99} \quad \text{(Equation 2)}$$

The Equation will be described. $I_n$ represents an absolute value of the electric motor current signal $I_{MO}$ sampled at the present time. $I_{n-1}$ represents an absolute value of the electric motor current signal $I_{MO}$ sampled at a last time. $I_{n-99}$ represents an absolute value of the electric motor current signal $I_{MO}$ sampled 99 times before. 0.99 and 0.01 indicate weighted coefficients. For the coefficient, 0.99 is set to a sampling value at the last time (last time), 0.98 is set to a sampling value at a time before the last (a second time from the last) . . . and 0.01 is set to a sampling value at a ninety-ninth time before (1 is set to a sampling value at the present time). In other words, the absolute values of the electric motor current signals $I_{MO}$ sampled 100 times including the present time and the past are integrated to calculate the integrated current value $I_s$. For the calculation, older data are less weighted. Such weighting is carried out because the older data less affect the present and next control states. Of course, the simple average of a current value which is not weighted may be applied as described in Japanese Patent No. 2528119 issued to the applicant. A sampling interval is one second in the embodiment. The interval can be properly set to 10 milliseconds, for example.

The integrated current value $I_s$ thus calculated is output to the maximum value limitation start indicating unit 26 and the limited current signal setting unit 27 in the rear stage. It is possible to estimate a range of a temperature rise of the FETs $13_{a1}$ to $13_{a4}$ from the integrated current value $I_s$. Moreover, it is possible to estimate the current FETs $13_{a1}$ to $13_{a4}$ from the Equation 1. Since the integrated current value $I_s$ is calculated at an interval of one second, the output is also carried out at an interval of one second.

The maximum value limitation start indicating unit 26 is constituted by an ROM and a logic circuit. The maximum value limitation start indicating unit 26 has a comparing function and a timer function, and decides whether or not a maximum value limitation is to be carried out from the integrated current value $I_s$, three kinds of reference values for the integrated current value $I_s$, three kinds of time flags and a predetermined time based on the timer function and outputs a maximum value limitation indicating flag C to be the result to the limited current signal setting unit 27. When the maximum value limitation is not carried out, the maximum value limitation indicating flag C is set to 0. On the other hand, when the maximum value limitation is to be carried out, the maximum value limitation indicating flag C is set to 1. The maximum value limitation start indicating unit 26 also serves as a limitation number measuring unit in the appended claims.

The reference value for the integrated current value $I_s$ is set to have a value of [a reference value for a first time]>[a reference value for a second time]>[reference values for a third time and thereafter]. In other words, it is difficult to carry out the maximum value limitation at the first time. Consequently, the atmospheric temperature (the initial set value) in the Equation 1 is set to be small at the first time (for example, 50° C.), is set to be larger at the second time (for example, 70° C.), and is set to be the largest at the third time and thereafter (for example, 80° C.). The reason why the reference value is thus set is that the temperatures of the FETs $13_{a1}$ to $13_{a4}$ are raised as the maximum value limitation is carried out from the first time toward the third time. In such a situation that the maximum value limitation is carried out, it is possible to set the same reference value at third and fourth times, that is, at the third time and thereafter (the reference value for the second time may be set to be equal to the reference values for the third time and thereafter).

When the time flag indicates the first time, the maximum value limitation start indicating unit 26 does not output the maximum value limitation indicating flag C=1 if the integrated current value $I_s$ does not exceed the reference value for the first time. Moreover, when the time flag indicates the second time, the maximum value limitation start indicating unit 26 does not output the maximum value limitation indicating flag C=1 if the integrated current value $I_s$ does not exceed the reference value for the second time. The same processing is carried out for the third time. If the integrated current value $I_s$ is less than the respective reference values, the maximum value limitation indicating flag C=0 is output.

First of all, the time flag is set to the first time. In the first embodiment, when the integrated current value $I_s$ which is less than the reference value for the first time is started to be increased again, the time flag is reset from the first time to the second time. In the case in which the integrated current value $I_s$ is more than the reference value for the second time when the increase is started, the maximum value limitation for the second time is immediately started. In the same manner, the time flag is reset from the second time to the third time and thereafter. At the third time and thereafter, the time flag is maintained to be third time and thereafter. These respects will be described below with reference to FIGS. 4A and 4B.

The time flag which is once set to the second time is reset to the first time when a predetermined time passes after the maximum value limitation for the first time through the timer function. Consequently, the actual second time is recognized as the first time, and the maximum value limitation is not carried out even if the integrated current value $I_s$ exceeds the reference value for the second time. The reason is that it is possible to estimate a reduction in the temperatures of the FETs $13_{a1}$ to $13_{a4}$ after a predetermined time passes since the maximum value limitation for the first time. The predetermined time is calculated from an experiment or a logic operation, and 5 minutes are set. These respects are the same at the second time and the third time and thereafter, and the time flag is reset to the first time after the predetermined time passes. Consequently, an unnecessary maximum value limitation can be eliminated so that a steering feeling can be improved. In this connection, a reference point for the predetermined time can be variously set to a time when the time flag is reset or a time when the integrated current value $I_s$ in the increase process is started to be decreased.

The limited current signal setting unit 27 is constituted by an ROM and a logic circuit. The limited current signal setting unit 27 always outputs the limited current signal $I_{LIM}$ to the signal limiting unit 22 irrespective of the execution of the maximum value limitation. More specifically, the limited current signal setting unit 27 always outputs the limited current signal $I_{LIM}$ having a maximum value (1) when the maximum value limitation is not carried out, that is, the maximum value limitation indicating flag C is 0. Therefore, the electric motor 8 can also be driven at a duty of 100%. On the other hand, (2) when the maximum value limitation is carried out, that is, the maximum value limitation indicating flag C is 1, (a) the limited current signal $I_{LIM}$ is decreased and output if the integrated current value $I_s$ is increased and (b) the limited current signal $I_{LIM}$ is increased and output if the integrated current value $I_s$ is decreased. The limited current signal $I_{LIM}$ is set by the following Equation.

| | |
|---|---|
| $\Delta I_s$=integrated current value $I_s$-last integrated current value $I_s$ | (Equation 3) |
| Limited current signal $I_{LIM}$=maximum value | (Equation 4) |
| Limited current signal $I_{LIM}$=last value-$k1 \times \Delta I_s$ | (Equation 5) |
| Limited current signal $I_{LIM}$=last value-$kb \times \Delta I_s$ | (Equation 6) |

The Equation 3 is used for deciding whether the integrated current value $I_s$ is in an increase process or a decrease process and for switching the Equations 5 and 6. The Equation 4 is selectively used when the maximum value limitation is not carried out, that is, the maximum value limitation indicating flag C is 0. The Equations 5 and 6 are selectively used when the maximum value limitation indicating flag C is 1. The Equation 5 is selectively used when the integrated current value $I_s$ is set in the increase process. According to the Equation 5, when the integrated current value $I_s$ is increased ($\Delta I_s$ is a positive value), the limited current signal $I_{LIM}$ is gradually decreased. The Equation 6 is selectively used when the integrated current value $I_s$ is set in the decrease process. According to the Equation 6, when the integrated current value $I_s$ is decreased ($\Delta I_s$ is a negative value), the limited current signal $I_{LIM}$ is gradually increased (the maximum value is an upper limit). A coefficient k1 in the Equation 5 may be equal to a coefficient kb in the Equation 6. In this case, one of the Equations 5 and 6 is not required. In this connection, the coefficient kb is determined in consideration of the cooling performance of the FETs $13_{a1}$ to $13_{a4}$ in the electric motor driving unit 13, wherein kb>k1 is set.

As described above, a last value is obtained one second before.

The operation of the electric power steering apparatus 1 according to the first embodiment mentioned above will be described with reference to FIGS. 4A and 4B (see FIGS. 1 to 3 if necessary).

FIG. 4A is a time chart showing a change in an integrated current value and FIG. 4B is a time chart showing a change in a limited current signal. In FIG. 4A, an axis of ordinate indicates an integrated current value and an axis of abscissa indicates a time. In FIG. 4B, an axis of ordinate indicates a limited current signal and an axis of abscissa indicates a time. In the following description, points a to m are related to FIG. 4A and points d', h' and l' are related to FIG. 4B.

First of all, a driver gets in a vehicle, starts up an engine and starts to drive the vehicle. The time flag is set to 1 and the maximum value limitation indicating flag C is set to 0. When the driver carries out a steering operation, the integrated current value $I_s$ is increased (ON1). Since the integrated current value $I_s$ does not reach a reference value for the first time on the point a, the maximum value limitation is not carried out and the limited current signal $I_{LIM}$ maintains to have a maximum value. For this reason, the steering operation of the driver is not limited but is assisted. Conventionally, all the reference values are equal to each other and are set to be small. Therefore, before the reference value for the first time is reached as in the embodiment, for example, on the point a corresponding to the vicinity of the reference values for the third time and thereafter, the maximum value limitation is started. Consequently, the steering feeling is deteriorated.

The description will be given again with reference to the time chart. When the driver continuously carries out the steering operation, the integrated current value $I_s$ is further increased and reaches the reference value for the first time on the point b. Consequently, the maximum value limitation indicating flag C is changed from 0 to 1 and the maximum value limitation for the first time is finally started. Before the point b is reached, the driver can comfortably carry out the steering operation. When the maximum value limitation for the first time is started, the value of the limited current signal $I_{LIM}$ is decreased based on the Equation 5. In this case, even if the target current signal $I_{MS}$ output from the target current signal setting unit 21 exceeds the limited current signal $I_{LIM}$, the limited current signal $I_{LIM}$ is output as the target current signal $I_{MS}$ in the signal limiting unit 22 (see FIG. 2). Therefore, the integrated current value $I_s$ is increased slowly. In other words, the assist for the steering operation of the driver is limited. However, a rise in the temperatures of the FETs $13_{a1}$ to $13_{a4}$ (see FIG. 3) is thus suppressed.

Since the driver still continues the steering operation, the integrated current value $I_s$ is thus increased.

When the driver stops (reduces) the steering operation on the point c, the integrated current value $I_s$ is started to be decreased (LOW1). To the contrary, the limited current signal $I_{LIM}$ is started to be increased. The limited current signal $I_{LIM}$ in the decrease process of the integrated current value $I_s$ is set by the Equation 6. Since kb in the Equation 6 is set to have a larger value than k1 in the Equation 5, the limited current signal $I_{LIM}$ is set to have a maximum value (an upper limit value) on the point d'. On the other hand, the integrated current value $I_s$ is continuously decreased and becomes lower than the reference value for the first time on the point d. At this point, the maximum value limitation indicating flag C is set to 0 and the time flag is maintained in the state for the first time. When the maximum value limitation indicating flag C is set to 0, the Equation 4 is selectively used.

Since the driver stops the steering operation on the point d and thereafter, the integrated current value $I_s$ is further decreased. When the driver restarts the steering operation on the point e (ON2), the integrated current value $I_s$ is started to be increased. At this time, the time flag is set to the second time. When the driver continuously carries out the steering operation, the integrated current value $I_s$ reaches the reference value for the second time on the point f. Consequently, the maximum value limitation indicating flag C is set to 1 and the maximum value limitation for the second time is started. The reference value for the second time is smaller than the reference value for the first time. Therefore, the heat generation of the FETs $13_{a1}$ to $13_{a4}$ is suppressed earlier than the first time. Thus, the reference value for the second time is set to be smaller because the temperatures of the FETs $13_{a1}$ to $13_{a4}$ are higher at the second time than those at the first time and the maximum value limitation should be carried out early to protect the FETs $13_{a1}$ to $13_{a4}$.

When the driver stops the steering operation on the point g (LOW2), the integrated current value $I_s$ is started to be decreased. On the other hand, the limited current signal $I_{LIM}$ is started to be increased. The limited current signal $I_{LIM}$ in the decrease process of the integrated current value $I_s$ is set based on the Equation 6. These respects are the same as in the first time mentioned above. The limited current signal $I_{LIM}$ is set to have a maximum value on the point h' and the integrated current value $I_s$ is set to be lower on the point h than the reference value for the second time (the maximum value limitation indicating flag C is set to 0 and the Equation 4 is selectively used).

Next, the driver starts the steering operation on the point i (ON3), the integrated current value $I_s$ is started to be increased. At the same time, the time flag is set to the third time and thereafter. Since the driver continuously carries out the steering operation, the integrated current value $I_s$ reaches the reference values for the third time and thereafter on the point j. Consequently, the maximum value limitation indicating flag C is changed to 1 so that the maximum value limitation for the third time is started and the limited current signal $I_{LIM}$ is gradually decreased. The maximum value limitation for the third time and thereafter is carried out earlier than that for the second time because the temperatures of the FETs $13_{a1}$ to $13_{a4}$ are higher at the third time and thereafter than the temperature for the second time. Consequently, a rise in the temperatures of the FETs $13_{a1}$ to $13_{a4}$ can be protected more reliably.

The integrated current value $I_s$ is changed to be decreased on the point k because the driver stops (reduces) the steering operation (LOW3). On the point l', the limited current signal $I_{LIM}$ is set to have a maximum value by the Equation 6. On the point l, the integrated current value $I_s$ becomes lower than the reference values for the third time and thereafter (the maximum value limitation indicating flag C is set to 0). On the point m, the integrated current value $I_s$ is changed to be increased by the steering operation of the driver (in this case, the time flag is maintained in the state for the third time and thereafter).

When the integrated current value $I_s$ does not exceed the reference value for the second time and a predetermined time passes from the point e, the time flag is reset from the second time to the first time. Similarly, when the integrated current value $I_s$ does not exceed the reference values for the third time and thereafter and a predetermined time passes from the point i (or m), the time flag is reset from the third time and thereafter to the first time. When the predetermined time passes, the reference points for resetting the time flag to the first time may be points c, g and k or points d, h or l.

According to the electric power steering apparatus 1 in accordance with the first embodiment, thus, the start of the maximum value limitation for the first time is delayed (started with difficulty) to assist the steering force of the driver. Consequently, the steering feeling can be prevented from being deteriorated or can be reduced. Moreover, the burden of the driver can also be lightened. In addition, the maximum value limitation for the second time in which it is supposed that the temperatures of the FETs $13_{a1}$ to $13_{a4}$ are higher than those at the first time is started earlier than the first time. Therefore, it is possible to reliably protect the FETs $13_{a1}$ to $13_{a4}$ from failures caused by a rise in the temperatures. For the maximum value limitations to be carried out at the third time and thereafter, similarly, the protection can be performed earlier than the second time (which is obvious from FIG. 4).

Second Embodiment

In a second embodiment, the maximum value limitation of a control signal (an electric motor control signal) in unload control is reduced for a first time. The same elements and members as those in the first embodiment have the same reference numerals as those in the first embodiment and description thereof will be omitted.

An electric power steering apparatus 1a according to the second embodiment is different from the electric power steering apparatus 1 according to the first embodiment in respect of a control unit 12a and other structures are identical (see FIG. 1).

With reference to FIG. 2, the structure of the control unit 12a will be described in detail.

The control unit 12a according to the second embodiment includes a target current signal setting unit 21, a signal limiting unit 22, a deviation calculating unit 23, a driving control unit 24, an integrated current calculating unit 25, a maximum value limitation start indicating unit 26a and a limited current signal setting unit 27a.

Description will be given to the maximum value limitation start indicating unit 26a and the limited current signal setting unit 27a which are different from the first embodiment.

The maximum value limitation start indicating unit 26a is constituted by an ROM and a logic circuit. The maximum value limitation start indicating unit 26a has a comparing function and a timer function, and decides whether or not a maximum value limitation is to be carried out from an integrated current value $I_s$, a reference value for the integrated current value $I_s$, three kinds of time flags and a predetermined time based on the timer function and decides which maximum value limitation is to be carried out, and outputs a maximum value limitation indicating flag D to be the result to the limited current signal setting unit 27a.

When the maximum value limitation is not carried out, the maximum value limitation indicating flag D is set to 0. When the maximum value limitation for a first time is to be carried out, the maximum value limitation indicating flag D is set to 1. When the maximum value limitation for a second time is to be carried out, the maximum value limitation indicating flag D is set to 2. When the maximum value limitations for a third time and thereafter are to be carried out, the maximum value limitation indicating flag D is set to 3. The maximum value limitation start indicating unit 26a also serves as a limitation number measuring unit in the present invention.

Differently from the first embodiment, there is only one reference value for the integrated current value $I_s$. In the second embodiment, the conditions for starting the maximum value limitation are set to be identical and the maximum value limitation is reduced (relieved) at the first time. Of course, the reference value for the maximum value limitation at the first time may be set to be large such that it is difficult to start the maximum value limitation as in the first embodiment. The reference value is obtained by setting the atmospheric temperature (initial set value) in the Equation 1 to 80° C., for example.

In the same manner as in the first embodiment, first of all, the time flag is set to the first time. The time flag is reset from the first time to the second time on a point where the integrated current value $I_s$ once increased to the reference value or more is started to be decreased and is changed to be increased again. The point where the increase is started again is not related to the reference value. In the case in which the point where the increase is started again is equal to or larger than the reference value, the next maximum value limitation is simply started immediately. Similarly, the time flag is reset from the second time to the third time and thereafter on the point where the integrated current value $I_s$ once increased to the reference value or more is started to be decreased and is changed to be increased again. At the third time and thereafter, the time flag is maintained to be the third time and thereafter.

In the case in which the reference value is not exceeded even if a predetermined time passes after the maximum value limitation for the first time through the timer function (that is, the maximum value limitation is not carried out again in the predetermined time), the time flag which is once set to the second time is reset to the first time. The reason is that it is possible to estimate a reduction in the temperatures of the FETs $13_{a1}$ to $13_{a4}$ (see FIG. 3) when the predetermined time passes after the maximum value limitation for the first time. The predetermined time is calculated from an experiment or a logic operation, and 5 minutes are set. These respects are the same for the time flag at the third time and thereafter, and the time flag is reset to the first time after the predetermined time passes. Consequently, the maximum value limitation can be set to be proper and a steering feeling can be improved. In this connection, a reference point for the predetermined time can be variously set to a time when the time flag is switched or a time when the integrated current value $I_s$ in the increase process is started to be decreased.

The limited current signal setting unit 27a is constituted by an ROM and a logic circuit. The limited current signal setting unit 27a always outputs the limited current signal $I_{LIM}$ to the signal limiting unit 22 irrespective of the execution of the maximum value limitation. More specifically, the limited current signal setting unit 27a always outputs the limited current signal $I_{LIM}$ having a maximum value (1) when the maximum value limitation is not carried out, that is, the maximum value limitation indicating flag C is 0. Therefore, the electric motor 8 can also be driven at a duty of 100%. On the other hand, (2) when the maximum value limitation is carried out, that is, the maximum value limitation indicating flag C is 1 to 3, (a) the limited current signal $I_{LIM}$ is decreased and output if the integrated current value $I_s$ is increased and (b) the limited current signal $I_{LIM}$ is increased and output if the integrated current value $I_s$ is decreased. The limited current signal $I_{LIM}$ is set by the following equation.

$\Delta I_s$=integrated current value $I_s$-last integrated current value $I_s$ \hfill (Equation 7)

Limited current signal $I_{LIM}$=maximum value \hfill (Equation 8)

Limited current signal $I_{LIM}$=last value$-k1\times\Delta I_s$ \hfill (Equation 9)

Limited current signal $I_{LIM}$=last value$-k2\times\Delta I_s$ \hfill (Equation 10)

Limited current signal $I_{LIM}$=last value$-k3\times\Delta I_s$ \hfill (Equation 11)

Limited current signal $I_{LIM}$=last value$-kb\times\Delta I_s$ \hfill (Equation 12)

The Equation 7 is used for deciding whether the integrated current value $I_s$ is in an increase process or a decrease process and for switching the Equations 9 to 11 and the Equation 12. The Equation 8 is selectively used when the maximum value limitation is not carried out, that is, the maximum value limitation indicating flag D is 0. The Equation 9 serves to carry out the maximum value limitation for the first time and is selectively used when the maximum value limitation indicating flag D is 1 and $\Delta_s$ is positive. According to the Equation 9, when the integrated current value $I_s$ is increased, the limited current signal $I_{LIM}$ is gradually decreased. The Equation 10 serves to carry out the maximum value limitation for the second time and is selectively used when the maximum value limitation indicating flag D is 2 and $\Delta I_s$ is positive. According to the Equation 10, when the integrated current value $I_s$ is increased, the limited current signal $I_{LIM}$ is gradually decreased. The Equation 11 serves to carry out the maximum value limitation for the third time and thereafter, and is selectively used when the maximum value limitation indicating flag D is 3 and $\Delta I_s$ is positive. According to the Equation 11, when the integrated current value $I_s$ is increased, the limited current signal $I_{LIM}$ is gradually decreased.

The Equation 12 serves to release the maximum value limitation and is selectively used when the maximum value limitation indicating flag D is any of 1 to 3 and $\Delta I_s$ is negative. According to the Equation 12, when the integrated current value $I_s$ is decreased, the limited current signal $I_{LIM}$ is gradually increased (the maximum value is an upper limit).

As described above, a last value is obtained one second before.

The coefficients in the Equations 9 to 11 have values of k1<k2<k3 (all of which are positive). Thus, k1 in the maximum value limitation for the first time is set to be small because the temperatures of the FETs $13_{a1}$ to $13_{a4}$ (see FIG. 3) are low and the maximum value limitation for the first time does not need to be carried out largely. Moreover, the coefficient for the second time is k2 which is smaller than k3 because the temperatures of the FETs $13_{a1}$ to $13_{a4}$ are lower than those at the third time and thereafter. The coefficients k1 to k3 are set in consideration of the temperature rise characteristics of the FETs $13_{a1}$ to $13_{a4}$ and kb is set in consideration of the cooling performance of the FETs $13_{a1}$ to $13_{a4}$. In the second embodiment, k2 is almost equal to kb.

The operation of the electric power steering apparatus 1a according to the second embodiment mentioned above will be described with reference to FIGS. 5A to 5C.

Figure 5A:
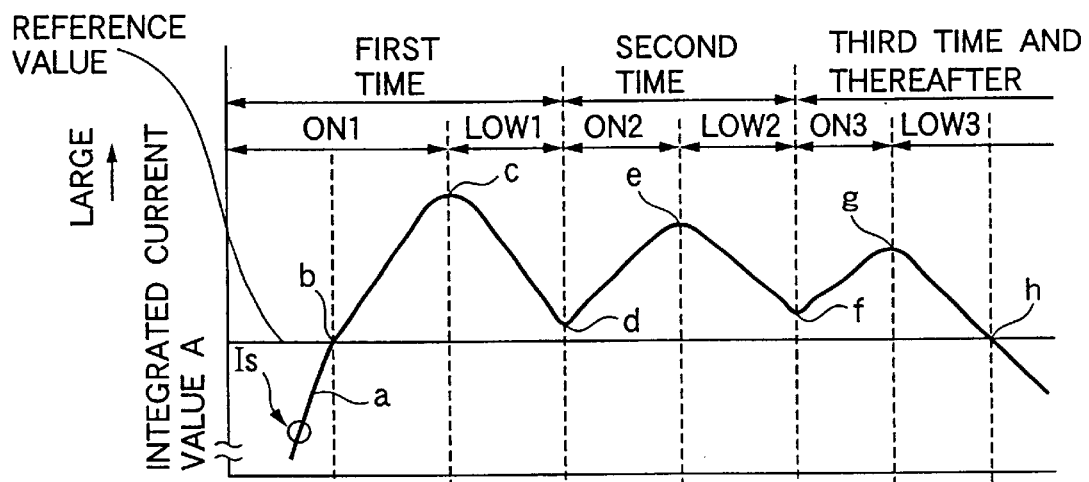
FIG. 5A is a time chart showing a change in an integrated current value according to a second embodiment of the invention.
Figure 5B:
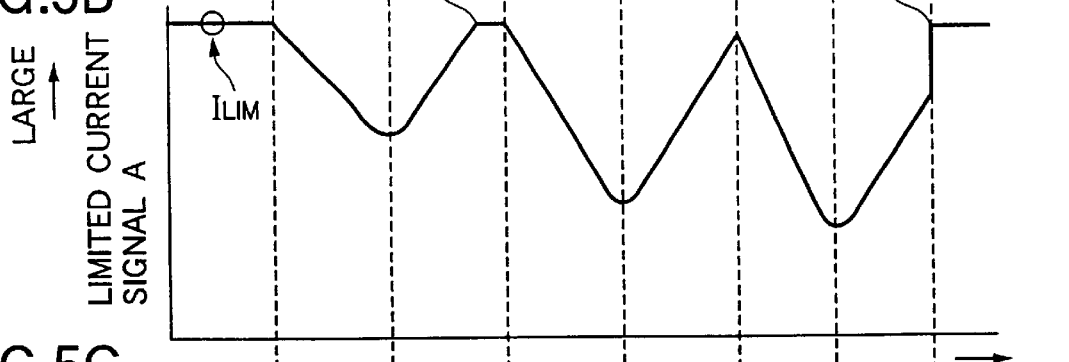
FIG. 5B is a time chart showing a change in a limited current signal according to a second embodiment of the invention; and, FIG. 5C is a time chart showing a variation in the limited current signal in an electric power steering apparatus according to a second embodiment of the invention.
Figure 5C:
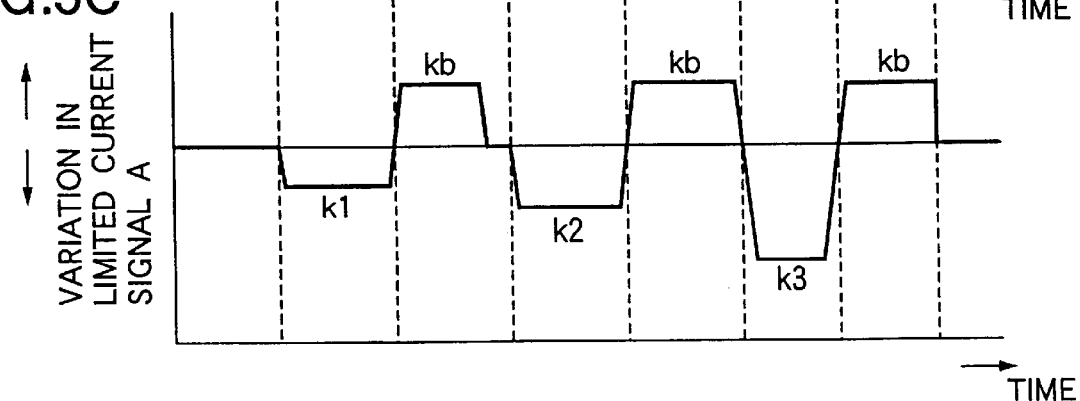

FIG. 5A is a time chart showing a change in an integrated current value, FIG. 5B is a time chart showing a change in a limited current signal and FIG. 5C is a time chart showing a variation in the limited current signal. In FIG. 5A, an axis of ordinate indicates an integrated current value and an axis of abscissa indicates a time. In FIG. 5B, an axis of ordinate indicates a limited current signal and an axis of abscissa indicates a time. In FIG. 5C, an axis of ordinate indicates a variation in the limited current signal and an axis of abscissa indicates a time. A time display in FIG. 5A indicates a set time flag. In the following description, points a to h are related to FIG. 5A and points d' and h' are related to FIG. 5B.

First of all, a driver gets in a vehicle, starts up an engine and starts to drive the vehicle. The time flag is set to 1 and the maximum value limitation indicating flag D is set to 0. When the driver carries out a steering operation, the integrated current value $I_s$ is increased (ON1). Since the integrated current value $I_s$ does not reach a reference value on the point a, the maximum value limitation is not carried out and the limited current signal $I_{LIM}$ maintains to have a maximum value (see Equation. 8).

When the driver continuously carries out the steering operation, the integrated current value $I_s$ is further increased and reaches the reference value on the point b. Consequently, the maximum value limitation indicating flag D is changed from 0 to 1 and the maximum value limitation for the first time is started. The reference value according to the second embodiment is normally small and is different from the large reference value for the first time according to the first embodiment.

When the maximum value limitation for the first time is started, the value of the limited current signal $I_{LIM}$ is decreased based on the Equation 9. In this case, even if a target current signal $I_{MS}$ output from the target current signal setting unit 21 exceeds the limited current signal $I_{LIM}$, the limited current signal $I_{LIM}$ is output as the target current signal $I_{MS}$ in the signal limiting unit 22 (see FIG. 2). Therefore, the integrated current value $I_s$ is increased slowly. In other words, the assist for the steering operation of the driver is limited. However, a rise in the temperatures of the FETs $13_{a1}$ to $13_{a4}$ (see FIG. 3) is suppressed. The limitation for the first time is smaller and gentler than the maximum value limitation for the second time and the maximum value limitation for the third time which will be described below. Correspondingly, the driver can receive a large assist. In this respect, the electric power steering apparatus according to the embodiment is more excellent than the conventional electric power steering apparatus.

When the driver stops (reduces) the steering operation on the point c, the integrated current value $I_s$ is started to be decreased (LOW1). To the contrary, the limited current signal $I_{LIM}$ is started to be increased. The limited current signal $I_{LIM}$ in the decrease process of the integrated current value $I_s$ is set by the Equation 12. Since kb in the Equation 12 is set to have a larger value than k1 in the Equation 9, the limited current signal $I_{LIM}$ is set to have a maximum value (to be constant after the maximum value) on the point d'. On the other hand, the integrated current value $I_s$ is continuously decreased and the driver starts the steering operation on the point d (ON2).

Consequently, the integrated current value $I_s$ is started to be increased. Thus, the time flag is set to be the second time. At this time, since the integrated current value $I_s$ is equal to or larger than the reference value, the maximum value limitation indicating flag D is set to 2 and the maximum value limitation for the second time is started immediately. Based on the Equation 10, the maximum value limitation for the second time is carried out more largely than the maximum value limitation for the first time. Consequently, the heat generation of the FETs $13_{a1}$ to $13_{a4}$ is suppressed more positively than that at the first time. Thus, the maximum value limitation for the second time is largely carried out because the temperatures of the FETs $13_{a1}$ to $13_{a4}$ are higher at the second time than those at the first time and the maximum value limitation should be carried out more positively to protect the FETs $13_{a1}$ to $13_{a4}$.

When the driver stops the steering operation on the point e (LOW2), the integrated current value $I_s$ is started to be decreased. On the other hand, the limited current signal $I_{LIM}$ is changed to be increased. The limited current signal $I_{LIM}$ in the decrease process of the integrated current value $I_s$ is set based on the Equation 12.

When the driver starts the steering operation on the point f (ON3), the integrated current value $I_s$ is started to be increased. Consequently, the time flag is set to the third time and thereafter. At this time, since the integrated current value $I_s$ is equal to or larger than the reference value, the maximum value limitation indicating flag D is set to 3 and the maximum value limitation for the third time is started immediately. Based on the Equation 11, the maximum value limitation for the third time (after the third time) is carried out more largely than the maximum value limitation for the first and second times. Consequently, the heat generation of the FETs $13_{a1}$ to $13_{a4}$ is suppressed more positively than that at the first and second times. Thus, the maximum value limitation for the third time is largely carried out because the temperatures of the FETs $13_{a1}$ to $13_{a4}$ are higher at the third time and thereafter than those at the first and second times and the maximum value limitation should be carried out positively to protect the FETs $13_{a1}$ to $13_{a4}$.

When the driver stops the steering operation on the point g (LOW3), the integrated current value $I_s$ is started to be decreased. On the other hand, the limited current signal $I_{LIM}$ is started to be increased. The limited current signal $I_{LIM}$ in the decrease process of the integrated current value $I_s$ is set based on the Equation 12. Since the integrated current value $I_s$ is lower than the reference value on the point h, the maximum value limitation start indicating flag D is set to 0. At the time of the point h, since k3 in the Equation 11 is set to be larger than kb in the Equation 12 (see FIG. 5C), the limited current signal $I_{LIM}$ does not have a maximum value. Accordingly, when the maximum value limitation indicating flag D is set to 0, the limited current signal $I_{LIM}$ has a maximum value based on the Equation 8. Therefore, a step is formed on the limited current signal $I_{LIM}$ (point h'). This step can also be smoothened by smoothing control.

When the integrated current value $I_s$ does not exceed the reference value but a predetermined time passes from the point h as in the first embodiment, the time flag is reset from the third time to the first time.

According to the electric power steering apparatus 1a in accordance with the second embodiment, thus, the maximum value limitation for the first time is set to be small and the steering force of the driver can be assisted by a relatively large auxiliary steering torque. Consequently, the steering feeling can be prevented from being deteriorated or can be reduced. Moreover, the burden of the driver can also be lightened. In addition, the maximum value limitation for the second time in which it is supposed that the temperatures of the FETs $13_{a1}$ to $13_{a4}$ are higher than those at the first time is carried out more largely than that for the first time. Therefore, it is possible to reliably protect the FETs $13_{a1}$ to $13_{a4}$ from failures caused by a rise in the temperatures. For the maximum value limitations at the third time and thereafter, similarly, the protection can be carried out more reliably than that at the second time.

The invention is not restricted to the embodiments of the invention described above but can be modified and carried out widely. For example, while the integrated current value is weighted by the Equation 2, a simple average which is not weighted may be applied. Moreover, although the temperature of the FET is estimated based on the Equation 1 and the maximum value limitation of the control signal (electric motor control signal [target current signal]) is carried out by the temperature of the FET thus estimated in the embodiments of the invention, the maximum value limitation of the control signal may be directly carried out based on only a current value in a predetermined time without the estimation of the temperature of the FET. In other words, the invention is not restricted to the atmospheric temperature (initial set value) of the Equation 1. Furthermore, while the maximum value limitation for the second time is different from the maximum value limitations for the third time and thereafter, the same maximum value limitation may be carried out at the second time and thereafter. Moreover, the first embodiment and the second embodiment may be properly combined and carried out.

The invention has the following excellent effects.

According to the first aspect of the invention, the maximum value limitation of the control signal for the first time is practically delayed to correspondingly assist the steering force of the driver. Consequently, the steering feeling can be prevented from being deteriorated or can be reduced. Moreover, the burden of the driver can also be relieved. At the second time in which it is supposed that the temperature of the FET is higher than that at the first time, the maximum value limitation is started earlier than the first time. Therefore, it is possible to reliably protect the FET from failures caused by a rise in the temperature. According to the electric power steering apparatus of the invention, therefore, the unload control (maximum value limitation) can be carried out properly.

According to the second aspect of the invention, moreover, the maximum value limitation of the control signal for the first time is carried out small to correspondingly assist the steering force of the driver. Consequently, the steering feeling can be prevented from being deteriorated or can be reduced. Moreover, the burden of the driver can also be relieved. At the second time in which it is supposed that the temperature of the FET is higher than that at the first time, the maximum value limitation is carried out more largely than the first time. Therefore, it is possible to reliably protect the FET from failures caused by a rise in the temperature. According to the electric power steering apparatus of the invention, therefore, the unload control (maximum value limitation) can be carried out properly.

What is claimed is:

1. An electric power steering apparatus, comprising:
   an electric motor for adding an auxiliary steering torque to a steering system of a vehicle;
   a steering torque detecting unit for detecting a manual steering torque of the steering system;
   a control unit for outputting a control signal controlling the electric motor in response to at least a signal sent from the steering torque detecting unit;
   a driving control unit including a switching element for driving the electric motor in response to the control signal sent from the control unit; and,
   a current detecting unit for detecting an electric motor current flowing to the electric motor,
   wherein the control unit controls to limit a maximum value of the control signal in response to a signal sent from the current detecting unit,
   the control unit includes a limitation number measuring unit for measuring the number of times of a maximum value limitation of the control signal, and the control unit is structured such that the maximum value limitation of the control signal is set to be smaller at a first time than that at a second time and thereafter.

2. The electric power steering apparatus according to claim 1, wherein the control unit determines the maximum value limitation of the control signal through a plurality of functions with respective coefficients depending on the number of times of the maximum value limitation.

3. The electric power steering apparatus according to claim 1, wherein the control unit includes:

an integrated current calculating unit calculating an integrated current value based on the electric motor current sent from the current detecting unit; and a maximum value limitation start indicating unit comparing the integrated current value with the reference values for deciding whether or not a maximum value limitation is to be carried out.

4. The electric power steering apparatus according to claim 3, wherein the limitation number measuring unit counts the number of times of the maximum value limitation when the decreased integrated current lower than the reference value is increased.

5. The electric power steering apparatus according to claim 4, wherein the limitation number measuring unit resets the number of times to the first time when a predetermined time passes in a state that the integrated current value does not exceed the next reference value after the last maximum value limitation.

* * * * *